United States Patent [19]

Höger et al.

[11] Patent Number: 4,942,661

[45] Date of Patent: Jul. 24, 1990

[54] APPARATUS FOR PERFORMING THE REMOTELY-MANIPULATED INSTALLATION AND REMOVAL OF DETACHABLE CONDUIT UNITS

[75] Inventors: Ernst Höger, Karlstein; Eberhard Obenauf, Offenbach, both of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 346,471

[22] Filed: May 2, 1989

[30] Foreign Application Priority Data

May 5, 1988 [DE] Fed. Rep. of Germany ....... 3815357

[51] Int. Cl.⁵ .................... B23P 19/04; G21C 19/16
[52] U.S. Cl. ........................ 29/723; 29/237; 29/819; 414/146
[58] Field of Search .................. 29/723, 819, 237; 414/10, 146, 745.1, 745.4, 746.8; 52/749

[56] References Cited

U.S. PATENT DOCUMENTS

| | | | |
|---|---|---|---|
| 3,600,277 | 8/1971 | Germer | 414/146 X |
| 4,081,086 | 3/1978 | Shallenberger et al. | 414/146 X |
| 4,096,031 | 6/1978 | Wade | 414/146 X |
| 4,259,153 | 3/1981 | Pryamilov et al. | 414/146 X |
| 4,795,606 | 1/1989 | Fenemore et al. | 414/146 X |

FOREIGN PATENT DOCUMENTS 149127 3/1988 European Pat. Off. .............. 29/723

Primary Examiner—Joseph M. Gorski
Assistant Examiner—Peter Dungba Vo
Attorney, Agent, or Firm—Walter Ottesen

[57] ABSTRACT

The invention is directed to an apparatus for performing the remotely-manipulated installation and removal of a pass-through conduit unit into and out of a channel formed in a partition wall. A feed assembly is part of the apparatus and includes a plurality of parts assembled to form an elongated body in the channel. An articulated coupling such as a ball joint couples the conduit unit to the elongated body. A drive is operatively connected to the elongated body for displacing the latter in the channel. A crane has a holder for holding and remotely manipulating the conduit unit as the latter is installed or removed from the channel.

11 Claims, 2 Drawing Sheets

APPARATUS FOR PERFORMING THE REMOTELY-MANIPULATED INSTALLATION AND REMOVAL OF DETACHABLE CONDUIT UNITSb

FIELD OF THE INVENTION

The invention relates to an apparatus for performing the remotely-manipulated installation and removal of a pass-through conduit unit into and out of a channel in a partition wall.

BACKGROUND OF THE INVENTION

Such an installation or removal operation is required, for example, in nuclear fuel reprocessing facilities when the pass-through conduits thereof have to be repaired or replaced. In that case, the pass-through conduits must be pulled out of partition walls which are provided for shielding between individual sections of the facility. The pass-through conduits have to be introduced again into such wall openings.

German published patent application No. DE-OS 34 01 278, which corresponds to European patent No. 149127, discloses a repair and installation carriage for nuclear facilities which is intended for use in the above-mentioned reprocessing facilities. This carriage has a platform which is adjustable in elevation and a shielded cabin which is carried thereon. However, this carriage is not well-suited for the operation of installing or removing a pass-through conduit notwithstanding the large number of tools which can be remotely controlled from the cabin because the tools are associated with the platform of the carriage and frequently the platform cannot be moved sufficiently close to the pass-through conduit to be installed.

SUMMARY OF THE INVENTION

It is an object of the invention to provide an apparatus of the kind described above which will permit pass-through conduits to be installed or removed exclusively via remote manipulation.

The apparatus of the invention is for a facility having a partition wall separating a first space from a second space with the partition wall defining a channel extending between the spaces for accommodating a pass-through conduit unit therein. The apparatus of the invention performs the remotely-manipulated installation and removal of the pass-through conduit unit into and out of the channel.

The apparatus of the invention includes: a feed assembly including a plurality of parts attachable one to the other to form an elongated body in the channel; articulated coupling means at one end of the conduit unit for coupling the conduit unit to the feed assembly; drive means operatively connected to the feed assembly for moving the same in the channel so as to displace the conduit unit therealong by moving the latter into or out of the channel; and, transport means arranged at a location in one of the spaces of the facility facing toward the other end of the conduit unit for holding and remotely manipulating the conduit unit as the latter is installed or removed from the channel.

The apparatus according to the invention comprises in particular two essential components, namely, the feed assembly and the drive means. The feed assembly is connected to the pass-through conduit unit and is moved by the drive means in such a way that the pass-through conduit unit is moved in its longitudinal direction into or out of engagement with the partition wall through which it passes. The articulate coupling means and the transport means provide that, after having been completely removed, the pass-through conduit unit can be transported away by the transport means.

On the other hand, when installing the pass-through conduit unit, the feed assembly is made ready in the channel of the partition wall and the conduit unit is brought to the feed assembly by the transport means and is connected to the feed assembly so that the conduit unit can then be introduced into the channel by the movement of the feed assembly driven by the drive means.

In a preferred embodiment of the invention, the elongated body of the feed assembly is curved. The longitudinal axis of the elongated body may extend in particular along a circular arc so that it is possible to handle conduit units having ends which terminate in different planes.

The elongated body of the feed assembly can advantageously have guide rollers mounted on the outer surface thereof. Preferably, the guide rollers are distributed around the periphery of the elongated body in order to provide a uniform support action on the wall surface of the channel formed in the partition wall.

For actuating the elongated body in the longitudinal direction, this body may advantageously have a toothed rack which is engaged with a toothed wheel of the drive means. In this embodiment, it is particularly advantageous for the toothed rack to include a bar or web portion which is guided against the toothed wheel, and projections which extend laterally from the web portion and which mesh with the toothed wheel. The web portion then laterally guides the elongated body. The projections are preferably in the form of pins or pegs and provide engagement points for the force in the longitudinal direction of the elongated body with which the latter is moved together with the pass-through conduit unit.

The parts of the feed assembly are advantageously hollow bodies which are connected with flanges. This configuration provides a high level of stability in spite of a lightweight construction. The connection of each two mutually adjacent ones of the hollow bodies may be made by means of quick-action connecting devices, for example, bayonet-type connections. It is also possible however to use threaded fasteners, for example, stud bolts or the like. Spring-loaded latches or similar connecting elements may also be used for assembling the feed assembly from the individual parts thereof.

The flexible or articulate coupling which forms the connection between the elongated body and the conduit unit advantageously comprises a ball joint which can permit movement in all directions which is desirable for engaging the transport means. In this connection, it is desirable for the ball socket to be open at the top to allow the ball to pass thereinto, so that the pivotal connection can be made with the downward movement of the conduit unit by means of a crane. Such a crane advantageously has a particular holder for engaging the conduit unit which permits the directed manipulation to be carried out, for example, by rotary movement.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
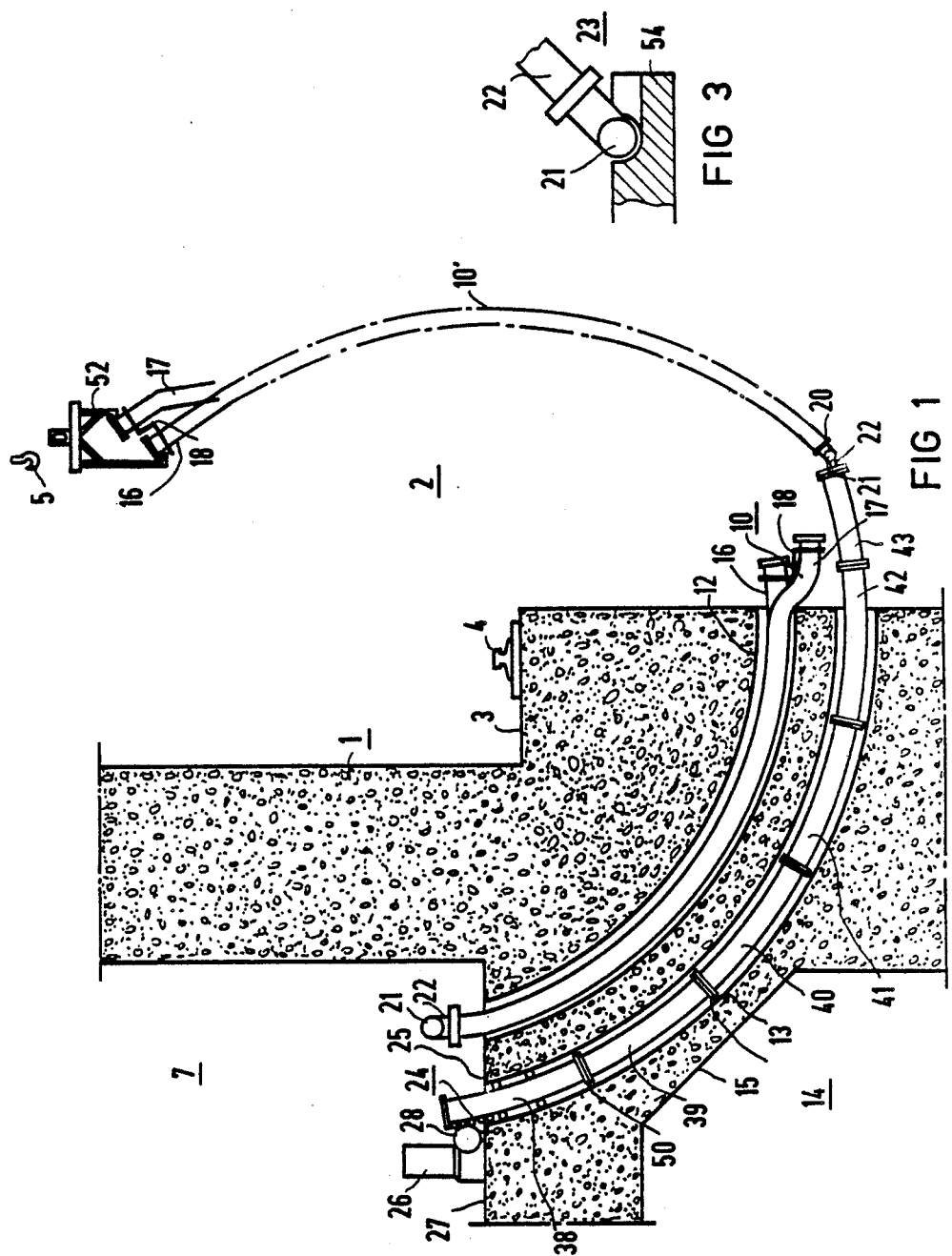
FIG. 1 is a view, in vertical section, through a partition wall of a reprocessing facility with a pass-through conduit unit which is replaced with the apparatus according to the invention.

The wall 1 is made of concrete and is part of a nuclear fuel reprocessing facility. The wall 1 is of different thicknesses of from 1 to 2 meters and separates three rooms from each other. They include an apparatus hall 2 accommodating chemical equipment (not shown) for treating the nuclear fuels. In the region of the hall 2, the wall 1 includes a step 3 with a crane rail 4 mounted thereon. The crane itself is represented only by its crane hook 5. Personnel are permitted in the hall 2.

Next to the hall 2 and above the step 3 there is a room 7 in which are disposed, for example, containers for accommodating liquids with radioactive materials. The liquids are pumped through pipelines which, in the region of the wall 1, include respective pass-through pipes which can be considered together as being a pass-through conduit unit 10. The pipes of the conduit unit 10 extend with a radius of curvature of for example 3.5 meters through correspondingly curved wall channels 12 and 13 which are embedded in wall 1. One end of each of the wall channels 12 and 13 terminates in a vertical plane in the wall surface which faces into the hall 2. In contrast, the other end of each of the channels which face into the room 7 is disposed in a horizontal plane. The room 7 can be entered under restricted conditions at least with protective clothing.

The room 14 which is under the room 7 beside the hall 2 is not affected by the conduit unit 10 because the wall 1 is thickened in the corner between the vertical and the horizontal regions by a bevel portion 15.

In each of the wall channels 12 and 13, one or two or more pass-through parallel pipes 16 and 17 are held together by a connecting plate 18 as a conduit unit 10 which is to be manipulated as a single piece. The parallel pipes 16 and 17 have a nominal width of, for example, 50 mm. A coupling 20 is provided at the other end of this unit and includes a projection 22 which terminates in a ball 21. The ball 21 forms a part of a ball joint 23 open at the upper end which is shown in FIG. 3 and which is used for remotely manipulated assembly by means of the apparatus 24 according to the invention.

Figure 2:
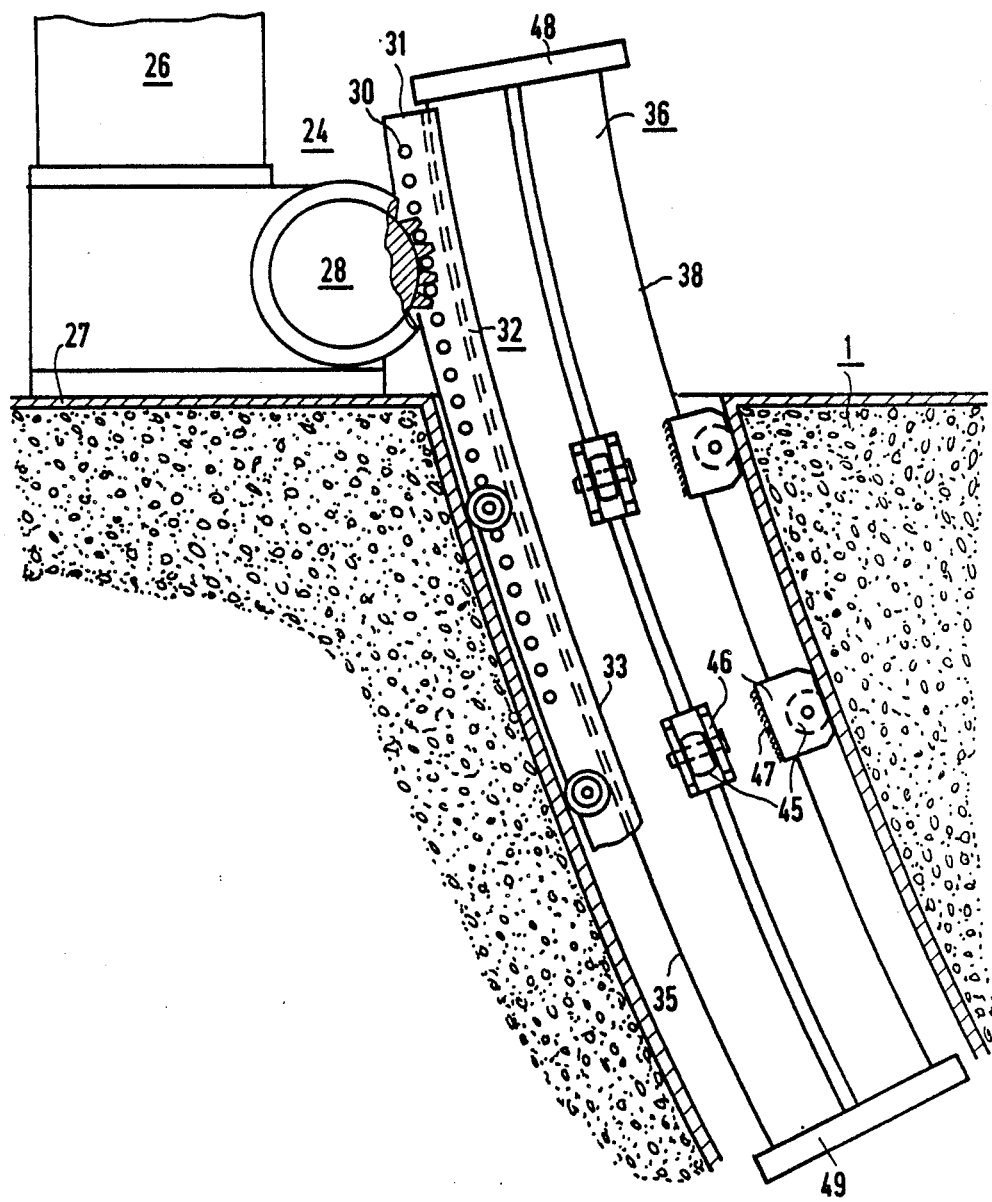
FIG. 2 is an enlarged view, in vertical section, of a detail of FIG. 1 showing the forward feed drive and one section of the elongated body of the feed assembly; and, FIG. 3 shows a detail of the articulate coupling means for coupling the elongated body of the feed assembly and the pass-through conduit unit.

FIG. 1 shows the beginning of the operation of installing a conduit unit with the apparatus 24. In FIG. 1, the conduit unit is shown in phantom outline at 10′ and is introduced into the wall channel 13. For this purpose, a feed drive unit 26 is secured to a metal cladding 27 of the wall 1 at the upper end 25 of the wall channel 13 which faces into the room 7. The forward feed drive unit 26 comprises a remotely-controllable electric motor which drives a toothed wheel in the form of a spur gear 28 via a transmission. Pins 30 mesh with the gear 28 as shown in FIG. 2 in a cut-away portion thereof. The pins 30 are mounted at uniform spacings from each other laterally on a web portion 31 of a toothed rack 32.

The toothed rack 32 extends along a circular arc in a vertical plane. The rack 32 is connected by a laterally-extending flange 33 to the tube 35 of a forward feed elongated body 36 which comprises identical individual tube sections 38 to 43 as shown in FIG. 1. Each of the six tube sections 38 to 43 has a set of four guide rollers 45 at each of two locations which are spaced from each other by a third of the length from each other and from the respective ends of the particular section. The guide rollers 45 of each set are distributed about the periphery of the tube section at equal intervals as shown in FIG. 2. The guide rollers 45 are disposed in respective holders 46 of U-shaped cross section. The holders 46 are welded to the tube 35 as indicated at 47. Flanges 48 and 49 are provided at the respective ends of each of the tube sections 38 to 43 so that the sections can be connected together by quick-action couplings at location 50.

The operation with the apparatus 24 according to the invention involves the following steps when installing the conduit unit into a channel provided in a partition wall.

First, the removed, remotely manipulatable conduit unit 10′ is suspended from the crane hook 5 via a holder 52.

Second, the hook 5 travels until the ball 21 lies in a ball socket 54 which is secured to the lower end of the forward feed body 36.

Third, the forward feed drive unit 26 moves the forward feed body 36 upwardly by the length of a tube section 38 while being guided by the rollers 45. During this operation the crane hook 5 must be correspondingly adjusted in its position.

Fourth, when a flange connection 50 is disposed above the drive unit 26, the latter is stopped and the tube section 38 removed.

Fifth, the further tube sections 39 to 43 are indexed upwardly in a stepwise manner until the conduit unit 10 is moved completely into the wall channel 13.

Sixth, the holder 52 is removed by changing over the suspension of the hook 5 in the eye combination.

After installation of the pass-through conduit unit 10, pipelines leading elsewhere can be connected to the individual pass-through pipes of the conduit unit.

The operation of removing the pass-through conduit unit 10 from the wall channel involves the steps delineated below. However, before these steps can be carried out, it is a requirement that the pass-through conduit unit 10 be cleaned and any pipelines connected thereto be removed.

First, the ball 21 of the ball joint 23 in the room 7 is seated on the installed conduit unit 10.

Second, the forward feed body 36 with the ball socket 54 is coupled to the ball 21.

Third, the forward feed drive unit 26 indexes the forward feed body 36 and therewith the conduit unit 10 downwardly by the length of a section of the feed body.

Fourth, the drive unit 26 is stopped and further conduit sections of the feed body 36 are attached.

Fifth, all conduit sections 38 to 43 are moved downwardly in a stepwise manner.

Sixth, as soon as the horizontal travel range of the crane hook 5 allows, the holder 52 is secured to the pass-through conduit unit 10. The pass-through conduit unit 10 is lifted in a stepwise manner until it has been entirely withdrawn from the wall channel 13 and the ball 21 can be lifted out of the ball socket 54.

Seventh, the pass-through conduit unit 10 is removed completely from the channel 13 and hangs freely from the hook 5 so that it can be transported away by the crane.

It is understood that the foregoing description is that of the preferred embodiments of the invention and that various changes and modifications may be made thereto without departing from the spirit and scope of the invention as defined in the appended claims.

What is claimed is:

1. In a facility having a partition wall separating a first space from a second space, said partition wall defining a through channel between said spaces for accommodating a pass-through conduit unit of a predetermined length therein, and an apparatus for performing a remotely-manipulated installation and removal of the pass-through conduit unit into and out of said channel from one of said spaces, the apparatus comprising:

a feed assembly including a plurality of segments rigidly attachable one to another to form an elongated body in the channel, with each of said segments having a predetermined length;

each two mutually adjacent ones of said segments defining an attachment interface;

releasable attachment means at each of the interfaces and on each of the segment for releasably attaching each two mutually adjacent ones of said segments to each other to hold said segments together as said elongated body;

coupling means for releasably coupling the conduit unit to said feed assembly;

drive means arranged on each one of said segments; a drive unit engaging said drive means for moving said feed assembly in said channel so as to displace and guide said conduit unit along said channel; and, transport means arranged at a location in said one space and facing toward an end of said conduit unit for holding and remotely manipulating said conduit unit as the conduit unit is installed and removed from said channel.

2. The apparatus of claim 1, each of said segments being a curved segment so as to cause said feed assembly to be a curved elongated body when said segments are attached one to another.

3. The apparatus of claim 2, said channel having a wall surface disposed in surrounding relationship to said elongated body; said elongated body having an outer surface facing toward said wall surface; and, said feed assembly further including a plurality of guide wheels mounted on said outer surface for engaging said wall surface for guiding said elongated body along said channel.

4. The apparatus of claim 3, said guide wheels being distributed over said outer surface.

5. The apparatus of claim 1, said elongated body having a longitudinal axis; said drive unit including a toothed wheel and a drive for driving said toothed wheel; and, each of said drive means including a toothed rack section mounted on the segment corresponding thereto so as to extend parallel to said axis and so as to cause the teeth thereof to be in meshing engagement with the teeth of said toothed wheel.

6. The apparatus of claim 5, the toothed rack section of each segment including: a bar having a length corresponding to the length of the segment and being fixedly connected to said segment so as to run parallel to said axis; and, a plurality of teeth arranged one behind the other along the length of said bar for meshing with the teeth of said toothed wheel.

7. The apparatus of claim 1, said elongated body having a longitudinal axis; said plurality of segments being respective hollow bodies arranged along said axis; and, said releasable attachment means including flanges formed on respective ends of each of said segments for permitting each two mutually adjacent ones of said bodies to be flange connected to each other.

8. The apparatus of claim 7, said releasable attachment means further including quick-acting latching devices for connecting the flanges of each two mutually adjacent ones of said hollow bodies together.

9. The apparatus of claim 1, said coupling means comprising a ball joint.

10. The apparatus of claim 9, said ball joint including: a ball mounted on one end of said conduit unit; a member mounted on said one end of said elongated body; and, said member having a socket formed therein so as to be open facing upwardly thereby facilitating engagement therewith by said ball.

11. The apparatus of claim 1, said transport means comprising a crane; and, a holder suspended from the crane for holding and remotely manipulating the conduit unit as the conduit unit is installed and removed from said channel.

* * * * *